United States Patent [19]
Al-Kufaishi

[11] 4,193,212
[45] Mar. 18, 1980

[54] UNIFIED ENGLISH PRONOUNCING ALPHABET

[76] Inventor: Hassan A. Al-Kufaishi, P.O. Box 124, Bloomington, Calif. 92316

[21] Appl. No.: 890,538

[22] Filed: May 17, 1978

[51] Int. Cl.² .................................................. G09B 17/00
[52] U.S. Cl. ........................................................ 35/35 R
[58] Field of Search ................. 35/35 R, 35 H, 36; 283/46

[56] References Cited

U.S. PATENT DOCUMENTS

| | | | |
|---|---|---|---|
| 129,600 | 7/1872 | Shearer | 283/46 |
| 198,507 | 12/1877 | Dawson | 283/46 |
| 290,830 | 12/1883 | Zachos | 283/46 |
| 3,407,515 | 10/1968 | Pitman | 35/35 R |
| 3,426,451 | 2/1969 | Hoffman | 35/35 R |
| 4,030,211 | 6/1977 | McGinley | 35/35 H |

*Primary Examiner*—William H. Grieb

[57] ABSTRACT

The present invention consists of a new set of diacritics, which when applied in the English alphabet in conjunction with the existing or traditional system of diacritical markings, provides through the single combined set, the ability to couple correct pronunciation of words with the correct spelling thereof.

1 Claim, 1 Drawing Figure

THE UNIFIED ALPHABET LISTED ACCORDING TO THE 47 SOUNDS.

| NUMBER | TRADITIONAL OR PRESENT | ADDED OR NEW | NUMBER | TRADITIONAL OR PRESENT | ADDED OR NEW | NUMBER | TRADITIONAL OR PRESENT | ADDED OR NEW |
|---|---|---|---|---|---|---|---|---|
| 1. | | (ˣ) No sound | 17 | î bîer / ê nêar | | 33 | s seed / c̣ ice | |
| 2. | ə / a alone / e system / i easəly / o gallop / u circəs | ə̆ / ă alone / ĕ system / ĭ easily / ŏ gallop / ŭ circus | 18 | j jar / ġ age | d̂ soldier | 34 | sh shall | c̈ ocean / ṣ sure / ẗ partial |
| | | | 19 | k kind / c cat | q unique | 35 | t top | d̄ reached |
| 3. | ā date | c̄ eight | 20 | l last | | 36 | ṯ thin | |
| 4. | ă ăt | | 21 | m must | | 37 | t̲ this | |
| 5. | â câre | | 22 | n no | | 38 | ŭ under | ŏ̆ lŏve |
| 6. | ä cär | | 23 | ng king / n̲ ink | | 39 | û ûrgent | ē̄ tērm / ī̄ bīrd / ō̄ wōrk |
| 7. | b big | | 24 | ō bōne | | | | |
| 8. | ch child | t̂ picture | 25 | ŏ lŏt | a̧ wa̧nt | 40 | v very | |
| 9. | d do | | 26 | ô fôr / a̱ a̱ll | | 41 | w was | ŭ pengŭin |
| 10. | ē mē / i̇ visa | ẏ duṫy | 27 | ōō boot | ö möve / ü rüle / ü̈ cüte / ẅ vieẅ | 42 | wh when | |
| 11. | ĕ ĕgg | | | | | 43 | | x̂ fox |
| 12. | f fun / ph phone | gh laugh | | | | 44 | | ẋ exam |
| 13. | ġ go | | 28 | ōŏ gōŏd | ủ pủt / ů fůry | 45 | y yes | e̊ few / i̱ un̲ion / u̇ fu̇ry / ü cüte |
| 14. | h hill | | | | | | | |
| 15. | ī bīte | ȳ bȳ | 29 | ou out | ow cow | 46 | z zero / ṡ rose | |
| 16. | ĭ it | a̍ vi̍llage / e̍ co̍llege / u̍ bu̍sy / y̍ my̍th | 30 | oi oil | oy boy | 47 | zh – | ġ̇ biege / ṡ vision / ż azure |
| | | | 31 | p pan | | | | |
| | | | 32 | r try | | | | |

Figure 1

THE UNIFIED ALPHABET LISTED ACCORDING TO THE 47 SOUNDS.

| NUMBER | TRADITIONAL OR PRESENT | ADDED OR NEW |
|---|---|---|
| 1. | | (×) No sound |
| 2. | ə<br>a alone<br>e system<br>i easəly<br>o galləp<br>u circəs | ə̊<br>å alone<br>e̊ system<br>i̊ easily<br>o̊ gallŏp<br>ů circus |
| 3. | ā date | ē̄ eight |
| 4. | ă at | |
| 5. | â care | |
| 6. | ä car | |
| 7. | b big | |
| 8. | ch child | t̂ picture |
| 9. | d do | |
| 10. | ē me<br>i visa | ẏ duty |
| 11. | ĕ egg | |
| 12. | f fun<br>ph phone | gh laugh |
| 13. | g go | |
| 14. | h hill | |
| 15. | ī bite | ȳ by |
| 16. | ĭ it | ȧ village<br>ė college<br>u̇ busy<br>ẏ myth |
| 17. | î bîer<br>ê nêar | |
| 18. | j jar<br>ġ aġe | ḋ soldier |
| 19. | k kind<br>c̣ cat | q unique |
| 20. | l last | |
| 21. | m must | |
| 22. | n no | |
| 23. | ng king<br>n̲ ink | |
| 24. | ō bone | |
| 25. | ŏ lŏt | a̩ want |
| 26. | ô fôr<br>a̤ all | |
| 27. | ōō boot | ö̈ möve<br>ü rüle<br>ü̊ cüte<br>ẅ vieẅ |
| 28. | ŏŏ good | ů pu̇t<br>u̇ fu̇ry |
| 29. | ou out | ow cow |
| 30. | oi oil | oy boy |
| 31. | p pan | |
| 32. | r try | |
| 33. | s seed<br>c̣ ic̣e | |
| 34. | sh shall | c̈ oc̈ean<br>ṡ ṡure<br>ṯ partial |
| 35. | t top | d̄ reached |
| 36. | t̲ thin | |
| 37. | t̲ this | |
| 38. | ŭ under | o̊ love |
| 39. | û ûrgent | ê̄ têrm<br>ī̄ bīrd<br>ō̄ wōrk |
| 40. | v very | |
| 41. | w was | ŭ penguin |
| 42. | wh when | |
| 43. | | ẋ fox |
| 44. | | ẋ exȧm |
| 45. | y yes | e̤ fe̤ẅ<br>i̤ union<br>ů fůry<br>ü cüte |
| 46. | z zero<br>ṡ roṡe | |
| 47. | zh — | ġ bieġe<br>ṡ viṡion<br>ż aẓure |

UNIFIED ENGLISH PRONOUNCING ALPHABET

BACKGROUND OF THE INVENTION

The inventor scrutinized the dictionary researching, for a number of years, every time a word was looked up casually or intentionally and concluded that the added diacritics that he devised were all that was deemed necessary to bring unity between pronunciation and spelling of an overwhelming majority of English words that pose problems such as having multiple sounds, are not pronounced, or pose other difficulties that result in obscurity and confusion. There were found remaining a very few types that were observed to have so few members that it was not warranted to make a special rule for them. Attempts have been made to remedy these problems with some success but limited advantage such as the Initial Teaching Alphabet (ITA) and the International Phonetic Alphabet (IPA); they both distort spelling and the latter requires a double burden of the learner, i.e., that he learn two alphabets, the IPA for pronunciation and the regular one for reading, whereas the Unified English Diacritical Pronouncing Alphabet hereinafter referred to as UEDPA or the Unified Alphabet (UA), permits unity of reading (visual) and pronunciation (vocal and auditory) of words.

BRIEF DESCRIPTION OF THE DRAWING

FIG. 1 lists the complete UEDPA according to the 47 sounds, listed as close to alphabetical order as possible. The first column is the identifying number for the sounds from 1 to 47 for easy reference. The second column lists the traditionally or presently-used diacritics with one example of application for the sounds. The third column shows the added or newly invented diacritical markings in their relationship with the traditional ones.

DETAILED DESCRIPTION

The following explanatory notes are limited to the added or new diacritics as they appear in FIG. 1 that shows the Unified English Diacritical Pronouncing Alphabet (UEDPA), listed according to the 47 sounds and are numbered the same as is the figure.

1. The omission mark (×) is used to exclude letters from being pronounced, thus keeping the orthography intact. The conventionally called "silent" or "mute" letters are so marked, as well as any letter that is not needed to convey pronunciation, as some letters in "listen," "isle," "yacht," "assign," and "kiss".

2. The schwa (ə) is retained for the same usage except that it is made smaller and instead of replacing letters "a," "e," "i," "o," or "u," it is placed above them as a diacritical mark. The underscored "u" with a schwa (ə) above it represents the combined sound of "y-ə," as in "circular." (See #45, FIG. 1.)

3. The double-dashed "ē" is added to convey the sound of macron "ā," as in "eight," "obey," "reign," and "survey." Many other letter combinations have sound of macron "ā"; they consist of: "ai," "au," "ay," "ea," "ei," "eight," "ey," "uet," and "et". By utilization of the omission mark over the silent letters of the combinations, and the macron over "ā" and double-dashed "ē", all of them can be pronounced as they should be.

4. No addition.
5. No addition.
6. No addition.
7. No addition.
8. The capped or crowned "t̂" is added to convey the "ch" sound as in "picture," "literature," "stature," and "bastion."
9. No addition.
10. The double-dotted "ÿ" is added to convey the long "ē" sound as in "duty," "company," and "theory." This also covers the "i" in "visa," already in use. There are also many letter combinations that have the sound of macron "ē," they are "ee," "eu," "ei," "eo," "ey," "ie," "ae," "oe," and "ay." By the utilization of all three marks, the macron, the omission mark and the double-dotted "ï" and "ÿ" we can read all of them readily.
11. No addition.
12. The "gh" is added to stand for letter "f" as in "laugh," and "cough." The "gh" as in "weigh," and "freight" should be marked with an omission mark on both the "g" and the "h."
13. No addition.
14. No addition.
15. The macroned "ȳ" is added to represent the long sound of "ī" as in "bȳ" and "nȳlon." As a rule for easy retention, the "i" and "y" are marked with the same diacritics to show the same sounds, i.e., for short or other sound variations of "i" and "y." The following letter combinations with this sound can be clarified by utilizing the omission mark as follows: "ye," "ie," "uy," "y," "ai," "eye," and "aye;" thus avoiding the burden of remembering so many variations for one sound.
16. The vertically dashed "a̒," "e̒," "u̒," and "y̒" are added to convey the sound of short "i," as in "coverage," "mechanic," "busy," and "rhythm." The dash mark bears a resemblance to the main body of letter "i," making it easy to remember.
17. No addition.
18. The dotted "ḋ" is added to indicate the sound of "j". This dot is a memory aid as well since it resembles the dot of the "j."
19. The letter "q" is to be considered to have the sound of letter "k" in all instances, thus precluding the necessity of re-spelling for pronunciation.
20. No addition.
21. No addition.
22. No addition.
23. No addition.
24. No addition.
25. The under-dotted "a̩" as in "want," "wander," and "wasp," is added to stand for the sound of breve "ŏ."
26. No addition.
27. Double mini-circle mark over letters "o̊," "ů," "ẘ," and underscored "u̲" are added to stand for the long double-ligatured "o͞o" as in "move," "truly," "future," and "ewe." Traditionally this sound is spelled "oo" but there are other combinations of letters with the same sound as follows: "ew," "eu," "oe," "ough," "ou," "ue," "ui," and "ioux," and by utilizing the omission mark and the mini double-circle over letters "o̊," "ů," or "ẘ" we can avoid the delay in learning by having to memorize the various spellings. Examples of the aforementioned are: "too," "brew," "pneumatic," "canoe," "through," "croup," "blue," "suite," "pooh," and "Sioux."
28. One mini-circle letter "ů" and underscored "u̲" is added to convey the sound of breve double-ligatured "ŏo" as in "sure," and "modulate."
29. The "ow" combination will be considered the same sound as "ou" as in "cow" and "town." In a word like "snow̽," the omission mark is a great boon and the word is marked thus: "snow̽."

30. The two-letter combination of "oy" is considered to have the same sound as "oi," as in "loyal" and "joy." Again, the "i" and "y" similar treatment is evident here by treating "oi" as "oy."

31. No addition.
32. No addition.
33. No addition.
34. A tri-dotted triangle mark over letters "c̈," "s̈," and "ẗ," is added to indicate the "sh" sound as in "delicious," "passion," and "patience."
35. Dashed "d̄" is added and stands for the sound of "t" as in "looked̄," and "taxed̄." For easy retention, one may associate the dash over "d" with the dash of letter "t."
36. No addition.
37. No addition.
38. Underlined breve ( ̆) is used over letter "ŏ" to convey the sound of breve "ŭ" as in "mŏther," "spŏnge," and "cŏmfort."
39. Overlined circumflex ( ̂) is added and placed over letters "ê," "î," and "ô" to stand for the circumflexed "û" sound as in "vêrse," "cîrcle," and "wôrk." This circumflex has a line over it to distinguish it from the circumflex over letters that convey sounds other than that of circumflex "û."
40. No addition.
41. An arrow-point design is added over letter "ŭ" and conveys the sound of "w" which it resembles. Words it is used on are "sangŭine," "assŭage," "Gŭatemala," and "qŭeen."
42. No addition.
43. Addition is a dot over "ẋ" which conveys "ks" as in "siẋ," "eẋplain," and "oẋ."
44. Addition consists of two dots over letter "ẍ" conveying "gz" sound as in "eẍact," and "Aleẍander."
45. The underscoring of "e̱," "i̱," "u̱," and "u̱," is added to add the sound of letter "y" to these vowels; underlined "i̱" would have the sound of "u." as in "u̱nion". Examples of the others are as follows: "fe̱w," "fu̱ry," and "cu̱te."
46. No addition.
47. Two dots over letters "g̈," "s̈," and "z̈," are added to convey the sound of "zh" as in "garäge," "Persïa," and "visïon."

The syllabification is marked by a slash as shown, between the syllables in the example "understand," to avoid distortion by dissection of the word. The heavy stress is made by the following mark ", a close, double-dash over the syllable to avoid confusion when the presently-used single, heavy mark is used in penmanship in study notebooks while the light stress is kept the same, which is one light slash as shown here in "democracy," and "democratic."

The UEDPA may be used as a permanent feature of the English language throughout the world, wherever it is being taught or learned both as a first or second language, at all age levels. It may be employed in notebooks and classroom procedures to teach youngsters (and students of any age level) how to relate the 26 letters and combined letters of the alphabet with the 47 UEDPA sounds so the learners can, by placing the relevant diacritical mark(s) on letters and words are able to read and pronounce them. The UEDPA will be particularly useful in independent study since it was originally designed within principles of this movement.

By virtue of its commitment of making no changes in orthography (spelling), the UEDPA may be used wherever the ITA and IPA and phonetic re-spelling are employed, thus in dictionaries, English manuals, vocabulary notebooks and texts, to furnish self-pronunciation by their use (printed) on the words. It may be used by college students for vocabulary study of new or unfamiliar difficult words.

Having, by the foregoing, described and illustrated the principal embodiment of my new system of diacritics, identified herein as the Unified English Diacritical Pronouncing Alphabet (UEDPA) or Unified Alphabet (UA), I state that variations upon the said marks through changes in the characters employed in the system are within the contemplation of my system. The shape or form of the diacritics are not the essential features, although unique and well designed for memory retention. The concept does, however, depend significantly upon the use of the least number of marks to enable pronunciation and spelling to be directly coupled, and the close to one hundred percent avoidance of re-spelling for purposes of eliciting pronunciation.

I claim:

1. A set of diacritic marks that allows the word to be read with self-pronunciation while still using the normal traditional spelling of the word, said set of 24 new marks covering 47 sounds to operate in conjunction with certain chosen traditional diacritics together with rules of application pertaining to the entire set, comprising a double-dash over "ē" for sound of long "ā"; a cap over "t" for sound of "ch"; double-dotted "ï" and "ÿ" for sound of long "ē"; rule that "gh" has sound of "f" except when it is silent; vertical dash over letters "á," "é," "ú," and "ý" for short "i" sound; macron over "ȳ" for long "ī" sound; general rule to consider "y" the same as "i" when being marked with diacritics; dot over "d" for "j" sound; "q" for sound of "k" always; underdotted "a" for sound of breve "o"; single mini-circle over "ŭ" and underscored "u̱" for sound of breve ligatured "oo"; double mini-circle over "o̊," "ů," underscored "u̱," and "W̊" for sound of long ligatured "o," ("ōō"); "ow" for sound of "ou"; "oy" for sound of "oi"; tri-dots in triangle form over "c̈," "s̈," and "ẗ," dash over "d̄" for sound of "t"; underlined breve mark ( ̆) over "ŭ" for breve "u"; overlined circumflex ( ̂) over "ê," "î," "ô," for sound of "u"; double dots over "g̈," "s̈," and "z̈," for sound of "zh"; a mini "x", the omission mark, over any letter of the alphabet which is silent; all marks being made while maintaining the orthography intact.

* * * * *